(12) United States Patent
Li et al.

(10) Patent No.: US 7,877,008 B2
(45) Date of Patent: Jan. 25, 2011

(54) WDM LAYER-BASED OPTICAL CHANEL PROTECTING DEVICE AND METHOD THEREOF

(75) Inventors: Weishi Li, Guangdong Province (CN); Youdao Xue, Guangdong Province (CN); Dianjun Xiao, Guangdong Province (CN); Yanming Liu, Guangdong Province (CN); Wenbin Luo, Guangdong Province (CN); Shiyin Zhang, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1742 days.

(21) Appl. No.: 10/519,319

(22) PCT Filed: May 29, 2003

(86) PCT No.: PCT/CN03/00407

§ 371 (c)(1), (2), (4) Date: Jan. 18, 2005

(87) PCT Pub. No.: WO2004/004183

PCT Pub. Date: Jan. 8, 2004

(65) Prior Publication Data

US 2006/0056842 A1    Mar. 16, 2006

(30) Foreign Application Priority Data

Jul. 1, 2002    (CN) .................................. 02 1 25068

(51) Int. Cl.
*H04B 10/00* (2006.01)
(52) U.S. Cl. .................................. 398/5; 398/19; 398/45
(58) Field of Classification Search .................. 398/2–7, 398/12, 19, 45, 9, 67, 72
See application file for complete search history.

(56) References Cited

U.S. PATENT DOCUMENTS 5,717,796 A    2/1998    Clendening (Continued)

FOREIGN PATENT DOCUMENTS

AU    2002100345 A4    5/2002

(Continued)

OTHER PUBLICATIONS

Lei et al. "M:N protection scheme and OADM implementation in WDM Optical Transport Networks" by Aug. 11, 2000.*

(Continued)

*Primary Examiner*—Dzung D Tran
(74) *Attorney, Agent, or Firm*—Conley Rose, P.C.; Grant Rodolph (57) ABSTRACT

The present invention discloses a WDM layer-based OChP device and the method thereof, i.e., M protection channels are added in the transmitting module and the receiving module to connect to receiving ends and transmitting ends of M protection channels in the WDM system; a switching device is added so as to switch signals in specified working channels to specified protection channels or switch signals transmitted in specified protection channels back to specified working channels according to switching requests from the WDM system; wherein M and N are natural numbers, and M<N. Because the number M of protection channels is less than the number N of the working channels, compared with 1+1 or 1:1 protection solution, this solution helps to save optical wavelength resource and initial cost. In addition, compared with 1+1 or 1:1 protection solution, when M>1, this solution can significantly reduce the risk of ruined backup performance due to above failures, without requiring increased cost.

19 Claims, 6 Drawing Sheets

U.S. PATENT DOCUMENTS

| | | | | |
|---|---|---|---|---|
| 5,982,517 | A * | 11/1999 | Fishman | 398/59 |
| 6,046,832 | A * | 4/2000 | Fishman | 398/45 |
| 6,292,281 | B1 * | 9/2001 | Bala et al. | 398/2 |
| 6,516,110 | B2 * | 2/2003 | Hayashi et al. | 385/17 |
| 6,915,075 | B1 * | 7/2005 | Oberg et al. | 398/9 |
| 6,975,811 | B1 * | 12/2005 | Kakizaki et al. | 398/2 |
| 6,983,108 | B2 * | 1/2006 | Sugawara et al. | 398/45 |
| 7,099,578 | B1 * | 8/2006 | Gerstel | 398/5 |
| 7,233,738 | B2 * | 6/2007 | Kerfoot, III | 398/10 |
| 7,546,034 | B2 * | 6/2009 | Mueller | 398/5 |
| 2003/0161629 | A1 * | 8/2003 | Frascolla et al. | 398/5 |

FOREIGN PATENT DOCUMENTS

| | | | |
|---|---|---|---|
| CA | 2 389 721 | | 5/2001 |
| EP | 0 877 502 | A2 | 11/1998 |
| EP | 1054524 | * | 5/2000 |
| EP | 1 017 242 | A1 | 7/2000 |
| EP | 1 054 524 | A2 | 11/2000 |
| EP | 1 161 014 | A1 | 12/2001 |
| EP | 1 206 060 | A1 | 5/2002 |
| JP | 11-136187 | A | 5/1995 |
| JP | 10-210008 | A | 8/1998 |
| JP | H10-210008 | | 8/1998 |
| JP | H11-068656 | | 3/1999 |
| JP | H11-136187 | A | 5/1999 |
| JP | H11-355210 | | 12/1999 |
| JP | 2000-151514 | | 5/2000 |
| JP | 2000-332655 | | 11/2000 |
| JP | 2000-332655 | A | 11/2000 |
| JP | 2002-141867 | | 5/2002 |
| WO | 01/45312 | A | 6/2001 |
| WO | 01/58203 | | 9/2001 |

OTHER PUBLICATIONS

Lei et al., "M:N Protection Scheme and OADM Implementation in WDM Optical Transport Networks," Proceedings of the SPIE, SPIE, Bellingham, VA, U.S., vol. 4225, Nov. 8, 2000, pp. 6-10, XP001039950.

Foreign Communication From a Related Counterpart Application—Notice of Rejection, JP Application No. 2004-516419, Mailing date Aug. 4, 2009.

* cited by examiner

WDM LAYER-BASED OPTICAL CHANEL PROTECTING DEVICE AND METHOD THEREOF

FIELD OF THE INVENTION

The present invention relates to a WDM layer-based Optical Channel Protection (OChP) device and method thereof.

BACKGROUND OF THE INVENTION

As Dense Wavelength Division Multiplex (DWDM) technology evolves rapidly, the transmission rate of WDM system increases quickly to meet ever-growing network data service and voice/image service requirements as well as telecom operators' ever-increasing demand for higher transmission bandwidth; at the same time, the reliability of WDM system becomes a prominent issue. On the basis of enhanced reliability of system modules, implementing a good protection solution will bring significant benefit to system reliability.

Presently, there are two types of WDM system protection solutions: one is Optical Multiplex Segment Protection (OMSP), which is also referred to as optical line protection; the other is OChP; the object of the former is primarily to protect transmission optical fibers; while the latter provides equipment-level protection and it employs the following working principle: whenever the signal transmission in a channel is interrupted or the performance is degraded to a certain degree, the switching device of the system will switch the signals from the channel to a protection channel to transmit; whether to perform the switch is solely determined by the determination device in the receiver according to the quality of received signals and requires no additional detection device.

As DWDM technology evolves by leaps and bounds and the transmission rate increases in doubles, the traffic in each channel becomes increasingly heavier, and the role of transmission channels in the network becomes more significant; as a result, the security and reliability of each channel becomes an inevitable factor in the network, which requires better OChP solutions.

Figure 1:
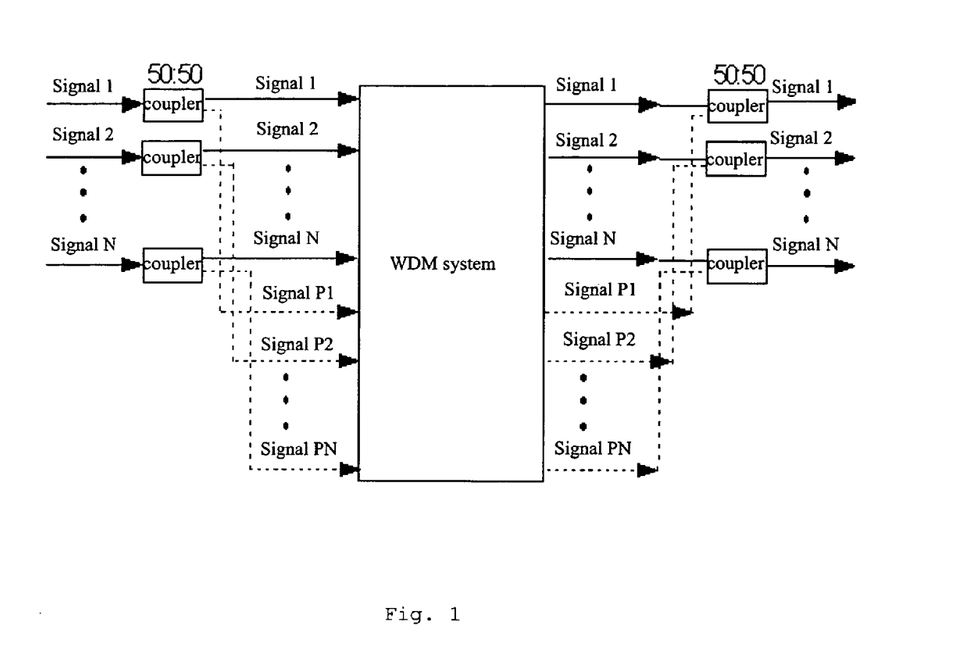
FIG. 1 is a schematic diagram of a traditional WDM-based 1+1 OChP solution.

One of the common OChP solutions for traditional WDM systems employs 1+1 or 1:1 scheme (where 1+1 represents cold backup; 1:1 represents hot backup; the difference between them lies in whether the protection channel transfers traffic when the working channel operates normally), i.e., a power distribution device is added at the optical signal input end of each working Optical Transform Unit (OTU), and one of the two signal outputs of the power distribution device is connected to the working OTU, the other signal output is connected to a backup OTU; in this way, in case the working OTU fails, the input signals may be changed to the backup OTU so as to ensure normal operation of the system. A typical 1+1 solution is shown in FIG. 1. And the coupler shown in FIG. 1 may be substituted with a 1×2 optical switch. The solid line portion in FIG. 1 shows routes of working channels, and the dotted line portion shows routes of protection channels. The feature of such a protection solution is that it utilizes a wavelength signal to protect another wavelength signal; therefore the number of working channels is equal to that of protection channels. Though above WDM-based 1+1 OChP solution can solve the problem of channel reliability, it requires higher initial cost of equipment because half of the wavelength resource is wasted.

SUMMARY OF THE INVENTION

The object of the present invention is to solve the above problem and to provide a WDM layer-based OChP device and method thereof, so as to realize an independent protection mechanism for the WDM layer with reduced wavelength waste and initial cost of equipment.

To attain said object, the present invention provides a WDM layer-based OChP device and a method thereof, so as to achieve signal transmission for working channels and routing selection for protection channels between the traffic transferred and the WDM system.

Said OChP device comprises a transmitting module and a receiving module; said transmitting module and receiving module both comprise N working channels connected to the receiving ends and transmitting ends of N working channels in the WDM system respectively, wherein said transmitting module and receiving module also comprise M protection channels, which are connected to the receiving ends and transmitting ends of M protection channels in the WDM system, and a switching device, which is designed to switch the signals in specified working channels to specified protection channels or switch the signals in specified protection channels back to specified working channels according to the switching requests from the WDM system; wherein M and N are both natural numbers, and M<N.

Said OChP method comprises the following steps:
(1) The WDM system monitoring the quality of signals in each channel and routing state of OChP modules in the system in real time;
(2) The WDM system determining whether there are some signals in the working channels should be switched to the protection channels; if yes, the WDM system selecting the protection channels;
(3) The WDM system sending accurate switching requests to the OChP transmitting module and the OChP receiving module;
(4) The OChP transmitting module and the OChP receiving module performing switch according to said switching requests from the WDM system.

With above solution, in normal cases, the OChP module chooses corresponding working channels for N-way signals entering said OChP module to access the WDM system to transmit; at the receiving end, the OChP module similarly chooses working channels to receive the signals; at this time, no traffic is transmitted in the protection channels, or the traffic transmitted through the protection channels will not be received by the OChP receiving module (only the traffic with low priority is transmitted). In case the quality of signals in m channels ($1 \leq m \leq M$) is degraded or lost due to channel failure, the OChP module at the transmitting end will switch the signals to protection channels to transmit; while the rest N-m signals are transmitted through the working channels; at the receiving end, the OChP module chooses corresponding protection channels to receive said m signals, and the rest N-m signals are received by the working channels. In this way, a WDM layer-based M:N OChP solution is implemented. Due to the fact that the number of channels and the probability of degraded signals or lost signals are trivial, the number M of protection channels may be less than the number N of working channels. Compared with 1+1 protection solution, it helps to save resource and initial cost. In case the number M of protection channels is more than 1, there are two or more cascade backup OTUs, which further reduces the risk of ruined backup performance due to failures of backup OTUs or failures of two or more working OTUs, without increasing construction cost of the system.

DETAILED DESCRIPTION OF THE EMBODIMENTS

The present invention will be described in further detail with reference to the following embodiments and drawings. The embodiments are suitable for both hot backup (M:N) and cold backup (M+N).

Figure 2A:
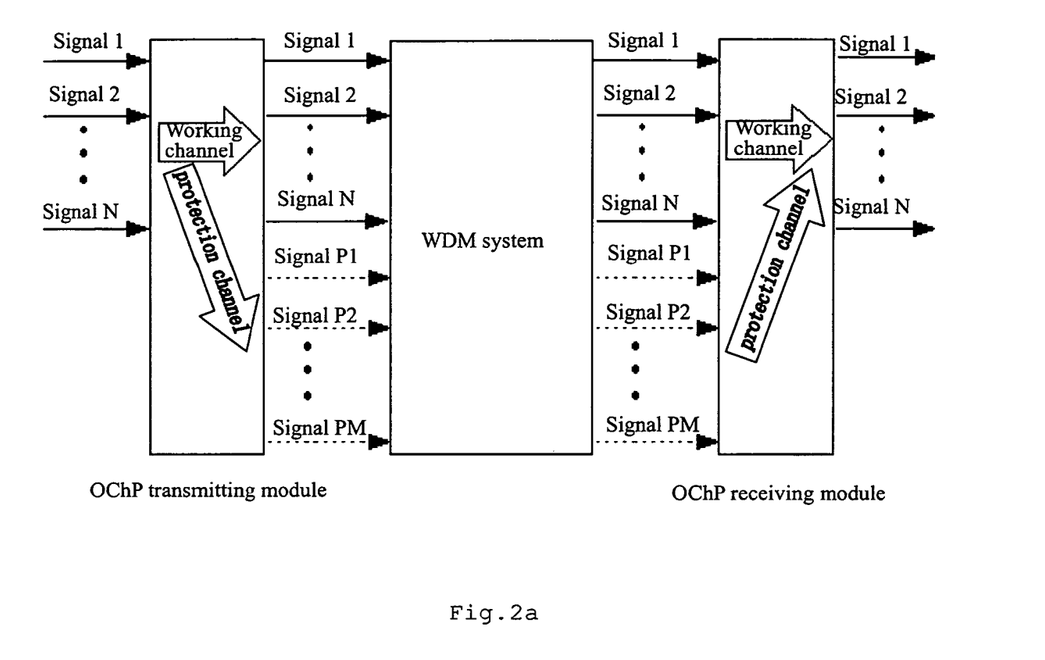
FIG. 2a shows the positions of the OChP modules in the WDM system according to the present invention.

Referring to FIG. 2a, the WDM layer-based OChP device according to the present invention comprises a transmitting module and a receiving module; said transmitting module and receiving module both comprise N working channels (N inputs and N outputs) connected to the receiving ends and transmitting ends of N working channels in the WDM system respectively.

Said transmitting module and receiving module also comprise M protection channels connected to the receiving ends and transmitting ends of M protection channels in the WDM system respectively.

Figure 2B:
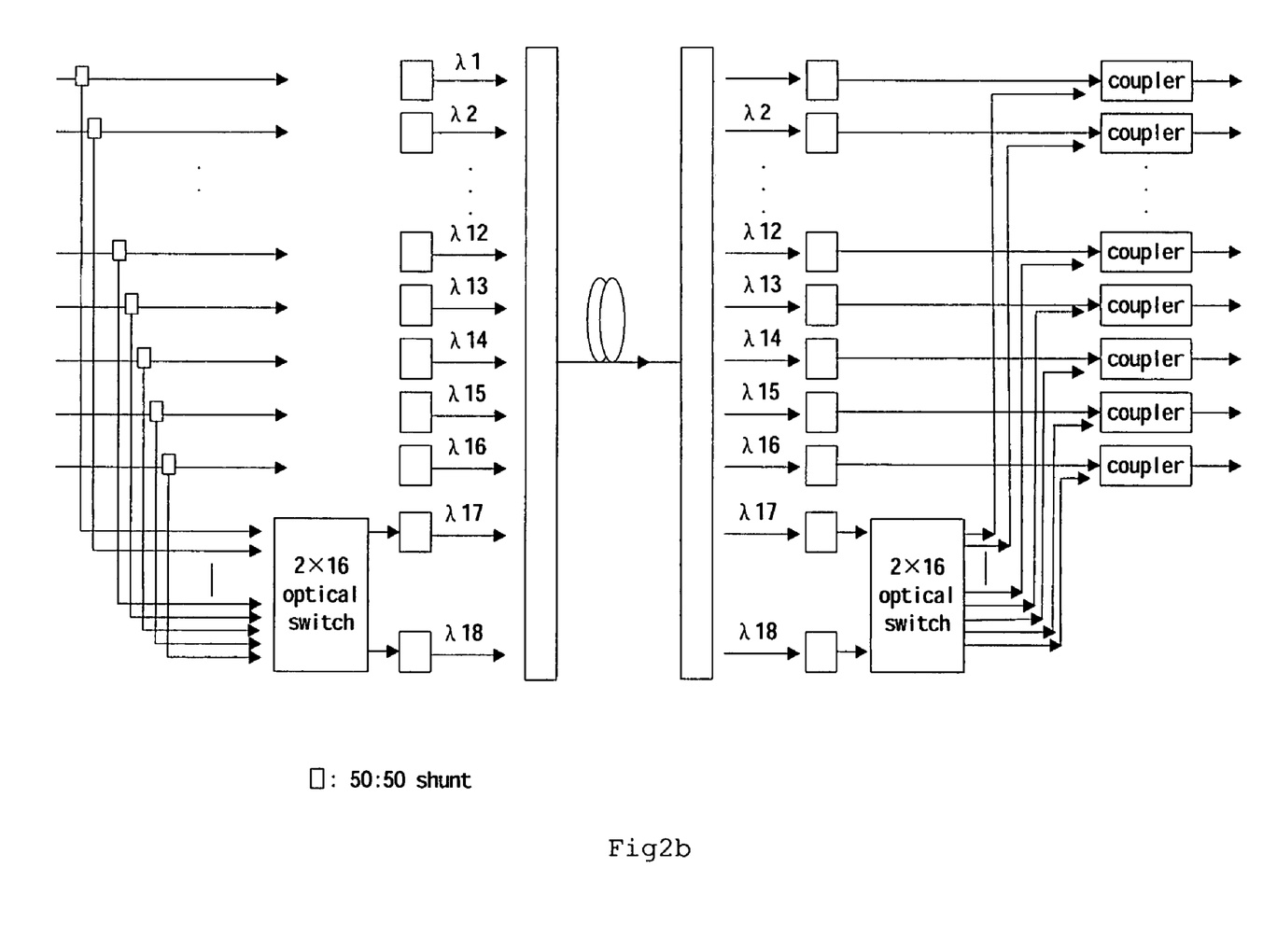
FIG. 2b is a schematic diagram of a WDM-based 1+N OChP solution according to the present invention.

Said transmitting module and receiving module also comprise a switching device, which is designed to switch the signals in specified working channels to specified protection channels or switch the signals in specified protection channels back to specified working channels according to the switching requests from the WDM system; wherein M and N are both natural numbers, and M<N. Referring to FIG. 2b (when M=1), compared with 1+1 protection solution, it helps to save resource and initial cost by using only one protection channel to protect the working channels.

Figure 3:
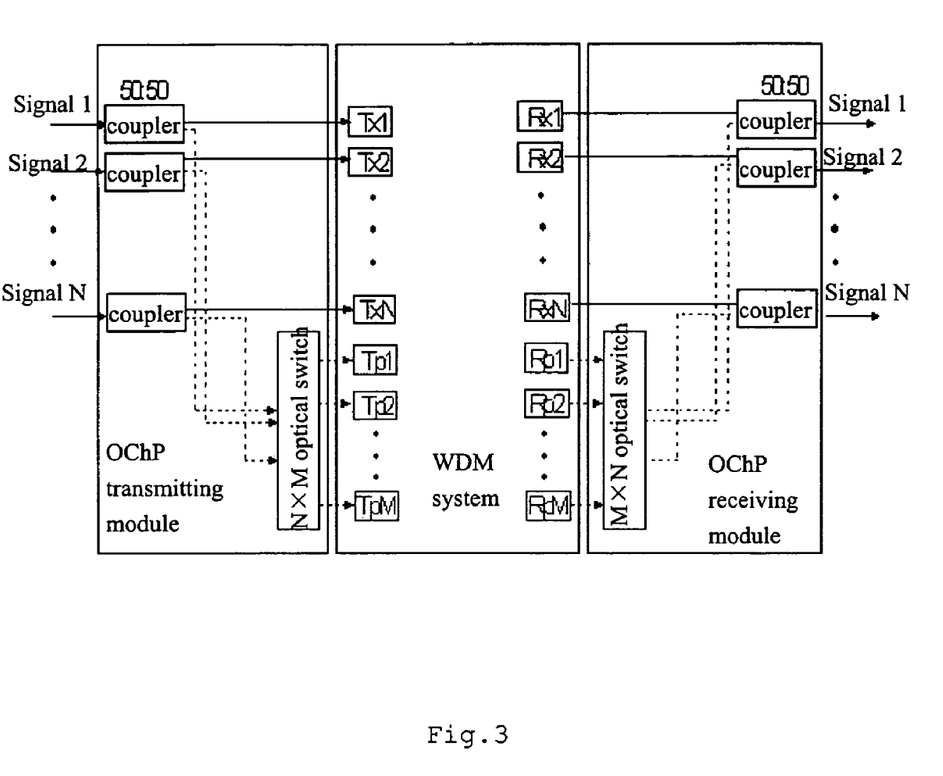
FIG. 3 shows the internal structure of an OChP module composed of couplers and optical switches.
Figure 4:
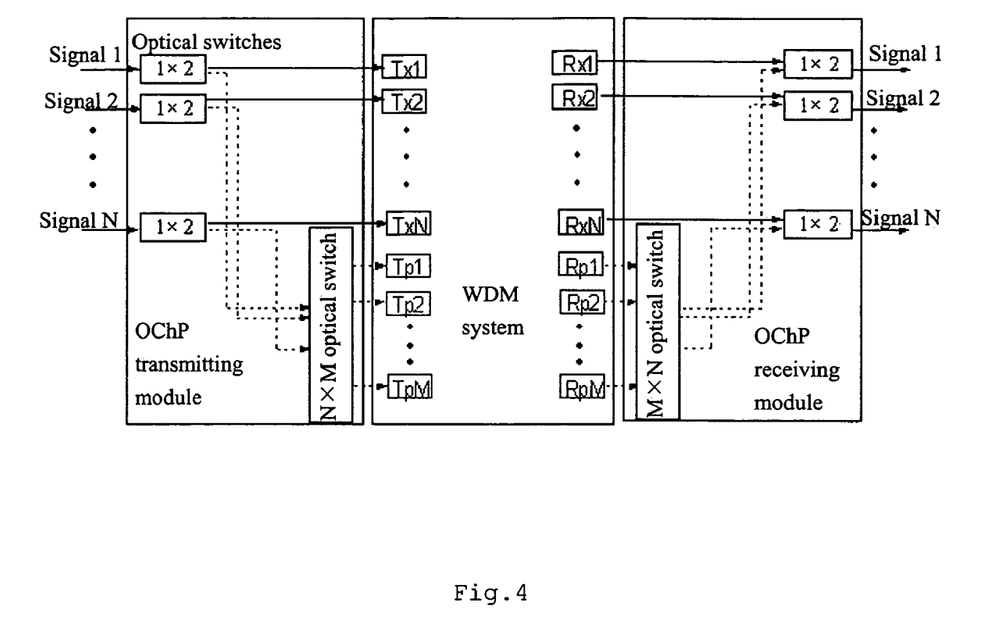
FIG. 4 shows the internal structure of the OChP module composed of optical switches.
Figure 5:
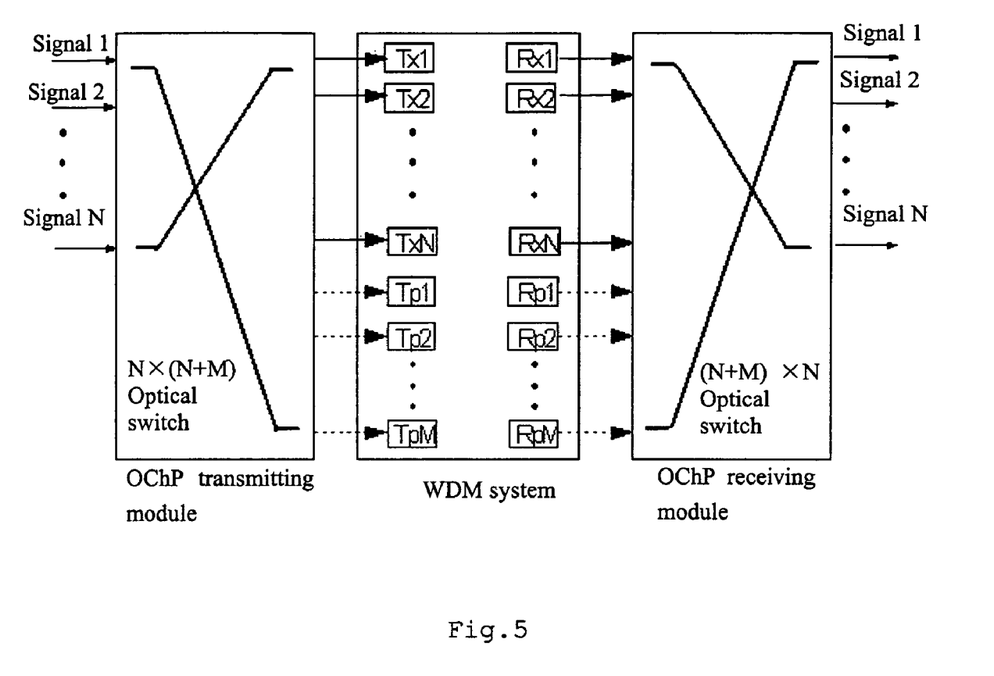
FIG. 5 shows the structure of an OChP module composed of N×(N+M) optical switches.

Though the 1:N or 1+1 protection solution shown in FIG. 2b can help to reduce the number of backup OTUs in use and enhance utilization ratio of optical wavelength, the premise for it is that the OTUs should operate normally; and if a backup OTU goes into a "trouble" state or OTUs in two or more working channels protected by the same backup OTU goes into a "trouble" state, the backup performance of the system is ruined. The solution is to have more than one protection channels, as shown in FIG. 3, FIG. 4, and FIG. 5.

Said device works as follows: in normal cases, the OChP module chooses corresponding working channels for N-way signals entering said OChP module to access the WDM system to transmit; at the receiving end, the OChP module similarly chooses working channels to receive the signals; at this time, no traffic is transmitted in the protection channels, or the traffic transmitted through the protection channels will not be received by the OChP receiving module. In case the quality of signals in m channels ($1 \leq m \leq M$) is degraded or lost due to channel failure, the OChP transmitting module switches the signals to protection channels to transmit; while the rest N-m signals are transmitted through the working channels; at the receiving end, the OChP module chooses corresponding protection channels to receive said m signals, and the rest N-m signals are received by the working channels. If a working channel for a signal currently transmitted through the protection channel recovers, the OChP module switches the signal back to the working channel.

Here, whether the signal in a working channel is switched to a protection channel is determined by the performance of the working channel and is solely determined by the corresponding receiver in the WDM system without any additional detection device because all receivers in the WDM system possess the function. In addition, whether the signals transmitted through a protection channel are switched back to the working channel also is determined by the performance of the working channel; therefore, the protection solution is WDM layer-based.

Both for working channels and protection channels, the OChP modules only choose corresponding routes for the signals instead of performing any treatment to the traffic carried by the signals; therefore, the OChP modules are transparent to the traffic.

Because the selection of routes of the signals performed by OChP modules is based on the performance of channels in the WDM system, it requires support from an appropriate protocol between the WDM system and the OChP modules. The protocol shall support the following functions:

(1) The WDM system monitoring the quality of signals in each channel and routing state of OChP modules in the system in real time;

(2) The WDM system determining whether some signals in the working channels should be switched to the protection channels and selecting the protection channels; similarly, the WDM system determining whether there are some signals in the protection channels should be switched back to the working channels;

(3) The WDM system sending accurate switching requests to the OChP transmitting module and the OChP receiving module simultaneously;

(4) The OChP modules performing switching according to said switching requests from the WDM system.

In view of above required features of OChP modules, we implemented the design. And the typical embodiments are described as follows:

Embodiment 1

The OChP modules comprise 50:50 couplers (also referred to as shunts) and M:N (or M×N or N×M, indicating M or N input ports and N or M output ports) optical switches; Referring to FIG. 3, the switching device of the transmitting module comprises N 50:50 couplers and an N×M optical switch; one of the two output ports of each coupler is connected to a working channel, and the other is connected to an input port of the N×M optical switch; M output ports of the N×M optical switch are connected to the M protection channels in the WDM system respectively; the switching device of the receiving module comprises 50:50 couplers and an M×N optical switch, one of the two input ports of each coupler is connected to a working channel in the WDM system, and the other is connected to an output port of the N×M optical switch; M input ports of the M×N optical switch are connected to the M protection channels in the WDM system respectively.

In the above case, the M:N optical switch should be controlled so that the lasers for working channels and protection channels at receiving end of the WDM system are not open simultaneously; instead, only either of them can be in working state; however, no such requirement is necessary for the lasers at transmitting end.

Embodiment 2

The OChP modules comprise 1×2 optical switches and M:N optical switches. Referring to FIG. 4, the switching device of the transmitting module comprises N 1×2 optical switches and an N×M optical switch; one of the two output ports of each 1×2 optical switch is connected to a working channel in the WDM system, the other is connected to an input port of the N×M optical switch; and M output ports of the N×M optical switch are connected to M protection channels in the WDM system respectively. The switching device of the receiving module comprises N 1×2 optical switches and a M×N optical switch; one of the two input ports of each 1×2 optical switch is connected to a working channel in the WDM system, the other is connected to an output port of the N×M optical switch; and M input ports of the M×N optical switch are connected to M protection channels in the WDM system respectively.

The above solution requires strict protocol control for the M:N optical switch and the 1×2 optical switches, i.e., the optical switches at both ends shall be switched to corresponding routes simultaneously; however, no such requirement is necessary for the lasers at transmitting end and receiving end.

Embodiment 3

The OChP modules comprise N×(N+M) optical switches. Referring to FIG. 5, the switching device of the transmitting module comprises an N×(N+M) optical switch, the N+M output ports of which are connected to N working channels and M protection channels in the WDM system respectively; the switching device of the receiving module comprises a (N+M)×N optical switch, the N+M input ports of which are connected to N working channels and M protection channels in the WDM system.

The above solution requires that the optical switches at both ends be switched to corresponding routes simultaneously; however, no such requirement is necessary for the lasers at transmitting end and receiving end.

The following calculation shows that the reliability of the system can be enhanced when M>1.

For any of above embodiments, for 2+16 wavelength protection (equivalent to two cascaded OTUs, i.e., two independent 1+8 protection devices are cascaded to form a 2+16 protection device), according to the calculation, the Mean Time Between Failures (MTBF) is prolonged by k/30 times (compared with original solution of two independent 1+8 protection devices), where k is the ratio of system available time to Time Between Failures (TBF). For example, if the availability of a single board is 99.99%, the value of k is about $10^4$; whenever a 9 is added after the decimal fraction part of the value of the availability, the value of k grows by an order of magnitude. If M+N solution (i.e., M cascaded OTUs) is used, the MTBF is prolonged by $k^{M-1}P_8^2/P_{8M}^{M+1}$ times (P represents factorial function). It is obvious that the OChP method according to the present invention helps to reduce cost and enhance system reliability when M>1.

The invention claimed is:

1. A WDM layer-based OChP (Optical Channel Protection) device capable of signal transmission through and routing between working channels and protection channels to/from a WDM system, comprising a transmitting module and
a receiving module;
the transmitting module and the receiving module each comprising
N working channels to be connected to receiving ends and to transmitting ends of N working channels of the WDM system respectively,
M protection channels to be connected to receiving ends and to transmitting ends of M protection channels of the WDM system respectively; and
a switching device designed to switch signals in specified working channels to specified protection channels and to switch signals in specified protection channels to specified working channels according to switching requests from the WDM system; wherein M and N are natural numbers and M<N.

2. The WDM layer-based OChP device according to claim 1, wherein M is greater than 1.

3. The WDM layer-based OChP device according to claim 1, wherein the switching device of the transmitting module comprises
N 50:50 couplers and
an N×M optical switch; one of the two output ports of each coupler being connected to a working channel in the WDM system, the other of the two output ports being connected to an input port of the N×M optical switch; M output ports of the N×M optical switch being connected to the M protection channels of the WDM system respectively; and
wherein the switching device of the receiving module comprises
N 50:50 couplers and
an M×N optical switch, one of the two input ports of each coupler being connected to a working channel in the WDM system, and the other of the two input ports being connected to an output port of the M×N optical switch; M input ports of the M×N optical switch being connected to the M protection channels of the WDM system respectively.

4. The WDM layer-based OChP device according to claim 1, wherein the switching device of the transmitting module comprises
N 1×2 optical switches and
an N×M optical switch, one of the two output ports of each 1×2 optical switch being connected to a working channel in the WDM system, the other of the two output ports being connected to an input port of the N×M optical switch; M output ports of the N×M optical switch being connected to the M protection channels of the WDM system respectively; and
wherein the switching device of the receiving module comprises
N 1×2 optical switches and
an M×N optical switch, one of the two input ports of each 1×2 optical switch being connected to a working channel in the WDM system, the other of the two input ports being connected to an output port of the M×N optical switch, and M input ports of the M×N optical switch being connected to the M protection channels of the WDM system respectively.

5. The WDM layer-based OChP device according to claim 1, wherein said switching device of said transmitting module comprises
an N×(N+M) optical switch, the N+M output ports of the N×(N+M) optical switch being connected to the N working channels and the M protection channels of the WDM system respectively; and wherein the switching device of the receiving module comprises
an (N+M)×N optical switch, the N+M input ports of the (N+M)×N optical switch being connected to the N working channels and the M protection channels of the WDM system respectively.

6. A WDM layer-based OChP method using the WDM layer-based OchP device capable of signal transmission through and routing between working channels and protection channels to/from a WDM system according to claim 1, the method comprising the following steps:
monitoring, by the WDM system, quality of signals in each channel and routing state of the transmitting module and the receiving module in the system in real time;
determining, by the WDM system, whether some signals in the working channels are to be switched to the protection channels; and if they are, selecting the protection channels of the WDM system;
sending, by the WDM system, accurate switching requests to the transmitting module and the receiving module;
performing, by the transmitting module and the receiving module, switching according to the switching requests from the WDM system.

7. The WDM layer-based OChP method according to claim 6, wherein M is greater than 1.

8. The WDM layer-based OChP method according to claim 6, further comprising
determining by the WDM system whether some signals transmitted in the protection channels are to be switched back to the working channels, and if they are, determining to which working channel the signals are switched, and sending accurate switching requests to the transmitting module and the receiving module simultaneously.

9. The WDM layer-based OChP method according to claim 6, wherein when no signals are switched to the protection channels, the protection channels carry traffic with low priority.

10. The WDM layer-based OChP device according to claim 1, wherein the switching requests are sent from the WDM system to the transmitting module and the receiving module simultaneously.

11. A WDM layer-based optical channel protection device for a multi-channel WDM system comprising
a transmitter comprising
N transmitter inputs;
N working outputs, each working output being connected to the receiving end of a working channel of the WDM system;
M protection outputs, each protection output being connected to the receiving end of a protection channel of the WDM system; and
a transmitter switching unit capable of directing signals from the N signal inputs to the N working outputs and to the M protection outputs; and
a receiver comprising
N receiver outputs;
N working inputs, each working input being connected to the transmitting end of a working channel of the WDM system;
M protection inputs, each protection input being connected to the transmitting end of a protection channel of the WDM system; and
a receiver switching unit capable of directing signals to the N signal outputs from the N working inputs and from the M protection inputs;
wherein the transmitter switching unit and the receiver switching unit are designed to switch signals in specified working channels to specified protection channels or switch signals in specified protection channels back to specified working channels according to switching requests from the WDM system, and M is less than N.

12. The device of claim 11, wherein M is greater than 1.

13. The device of claim 11,
wherein the transmitter switching unit comprises
an N×M transmitter optical switch comprising N input ports and M output ports, each output port being coupled to the receiving end of a protection channel of the WDM system and
N transmitter couplers, each transmitter coupler comprising
an input port coupled to a corresponding transmitter input,
a first output port coupled to the receiving end of a working channel of the WDM system, and
a second output port coupled to an input port of the N×M transmitter optical switch; and
wherein the receiver switching unit comprises
an M×N receiver optical switch comprising M input ports and N output ports, each input port being coupled to the transmitting end of a protection channel of the WDM system and
N receiver couplers, each receiver coupler comprising
an output port coupled to a corresponding receiver output,
a first input port coupled to the transmitting end of a working channel of the WDM system, and
a second input port coupled to an output port of the M×N receiver optical switch.

14. The device of claim 11,
wherein the transmitter switching unit comprises
an N×M transmitter optical switch comprising N input ports and M output ports, each output port being coupled to the receiving end of a protection channel of the WDM system and
N transmitter 1×2 optical switches, each transmitter 1×2 optical switch comprising an input port coupled to a corresponding transmitter input,
a first output port coupled to the receiving end of a working channel of the WDM system, and
a second output port coupled to an input port of the N×M transmitter optical switch; and
wherein the receiver switching unit comprises
an M×N receiver optical switch comprising M input ports and N output ports, each input port being coupled to the transmitting end of a protection channel of the WDM system and
N receiver 1×2 optical switches, each receiver 1×2 optical switch comprising
an output port coupled to a corresponding receiver output,
a first input port coupled to the transmitting end of a working channel of the WDM system, and
a second input port coupled to an output port of the M×N receiver optical switch.

15. The device of claim 11,
wherein the transmitter switching unit comprises
an N×(N+M) transmitter optical switch comprising
N input ports, each input port being coupled to a corresponding transmitter input,
N output ports, each of the N output ports being coupled to the receiving end of a working channel of the WDM system, and M output ports, each of the M output ports being coupled to the receiving end of a protection channel of the WDM system and wherein the receiver switching unit comprises an (N+M)×N receiver optical switch comprising N output ports, each output port being coupled to a corresponding receiver output, N input ports, each of the N input ports being coupled to the transmitting end of a working channel of the WDM system, and M input ports, each of the M input ports being coupled to the transmitting end of a protection channel of the WDM system.

16. A WDM layer-based optical channel protection method using the WDM layer-based optical channel protection device for a multi-channel WDM system according to claim 11, comprising monitoring, by the WDM system, quality of signals carried by the channels, determining, by the WDM system, based on the quality of a signal in a working channel whether to route the signal via a protection channel, sending, by the WDM system, a first switching request to a transmitter switching unit to route the signal via a protection channel, sending, by the WDM system, a second switching request to a receiver switching unit to route the signal via a protection channel, and switching, by the transmitter switching unit or/and the receiver switching unit, the signal in the working channel to a protection channel or switching the signal in the protection channel back to a working channel according to the switching requests from the WDM system, wherein the multi-channel WDM system comprises N working channels and M protection channels, M being less than N, and wherein the protection channel and the working channel are specified by the first switching request and the second switching request from the WDM system.

17. The method of claim 16, wherein M is greater than 1.

18. The method of claim 16, further comprising determining whether to route a signal on a protection channel via the signal's working channel;

sending a first switching request to a transmitter switching unit to route the signal via the signal's working channel, and sending a second switching request to a receiver switching unit to route the signal via the signal's working channel.

19. The method of claim 16, further comprising routing low-priority traffic via the protection channels when the protection channels do not carry signals.

* * * * *